United States Patent [19]

Levine et al.

[11] Patent Number: 4,803,726

[45] Date of Patent: Feb. 7, 1989

[54] BIT SYNCHRONIZATION METHOD FOR A DIGITAL RADIO TELEPHONE SYSTEM

[75] Inventors: Stephen N. Levine, Itasca; Larry C. Puhl, Sleepy Hollow; Harry M. Bliss; Gerald E. Corrigan, both of Chicago, all of Ill.

[73] Assignee: Motorola, Inc., Schaumburg, Ill.

[21] Appl. No.: 948,199

[22] Filed: Dec. 31, 1986

[51] Int. Cl.[4] .......................... H04K 1/02; H04L 7/00
[52] U.S. Cl. ........................................ 380/48; 370/84; 370/102; 370/110.1; 375/112; 375/114
[58] Field of Search .................. 380/48; 375/116, 118, 375/112, 114; 370/84, 102, 110.1

[56] References Cited

U.S. PATENT DOCUMENTS

| | | | |
|---|---|---|---|
| 3,825,683 | 7/1974 | Pitroda et al. | 178/69 |
| 3,839,599 | 10/1974 | Pitroda | 178/69 |
| 4,181,975 | 1/1980 | Jenkins | 364/900 |
| 4,327,411 | 4/1982 | Turner | 364/900 |
| 4,341,925 | 7/1982 | Doland | 380/48 |
| 4,383,322 | 5/1983 | Halpern et al. | 375/112 |
| 4,429,386 | 1/1984 | Graden | 370/100 |
| 4,434,323 | 2/1984 | Levine et al. | 380/48 |
| 4,574,243 | 3/1986 | Levine | 328/155 |
| 4,606,042 | 8/1986 | Kahn et al. | 380/48 |
| 4,622,666 | 11/1986 | Graves et al. | 370/100 |
| 4,649,543 | 3/1987 | Levine | 375/116 |
| 4,654,867 | 3/1987 | Labedz et al. | 379/59 |
| 4,661,657 | 4/1987 | Grenzebuch et al. | 380/48 |
| 4,701,939 | 10/1987 | Stutt et al. | 375/115 |
| 4,723,283 | 2/1988 | Nagasawa et al. | 380/48 |

OTHER PUBLICATIONS

Bell Telephone Laboratories, *Transmission Systems for Communications*, 5th Edition, 1982, pp. 683–688.

Bright et al., pending U.S. patent application Ser. No. 06/903,360, filed Sep. 3, 1986, entitled "Secure Communication System".

Diffie, W. et al., "Privacy and Authentication: An Introduction to Cryptography", *Proceedings of the IEEE*, vol. 67, No. 3, (Mar. 1979), pp. 397–427.

Levine et al., PCT International Publication No. WO 87/01490, published Mar. 12, 1987, Corresponding to Cross-Referenced Pending U.S. patent application Ser. No. 771,460.

Norton, Jerry J., "Drop Your Costs, But Not Your Bits with A Manchester-Data Decoder", *Electronic Design 15* (Jul. 19, 1979), pp. 110–116.

*Primary Examiner*—Salvatore Cangialosi
*Attorney, Agent, or Firm*—Douglas A. Boehm; Charles L. Warren; Donald B. Southard

[57] ABSTRACT

A method and means for maintaining continuous bit synchronization of data transmitted from a remote unit through a base unit to a landline unit is disclosed. An input data stream at a first bit rate, such as digitized or encrypted speech, is interleaved with a plurality of signalling words, and transmitted over an RF channel at a second bit rate. The base site recovers the clock of the received data, strips off the signalling word, modifies the bit rate of the received data, and adjusts the recovered clock rate to provide an output data stream which is in bit synchronization with the input data stream and within a predetermined modem specification. The encrypted data is then sent over landlines to a decryption unit which requires bit synchronization.

52 Claims, 10 Drawing Sheets

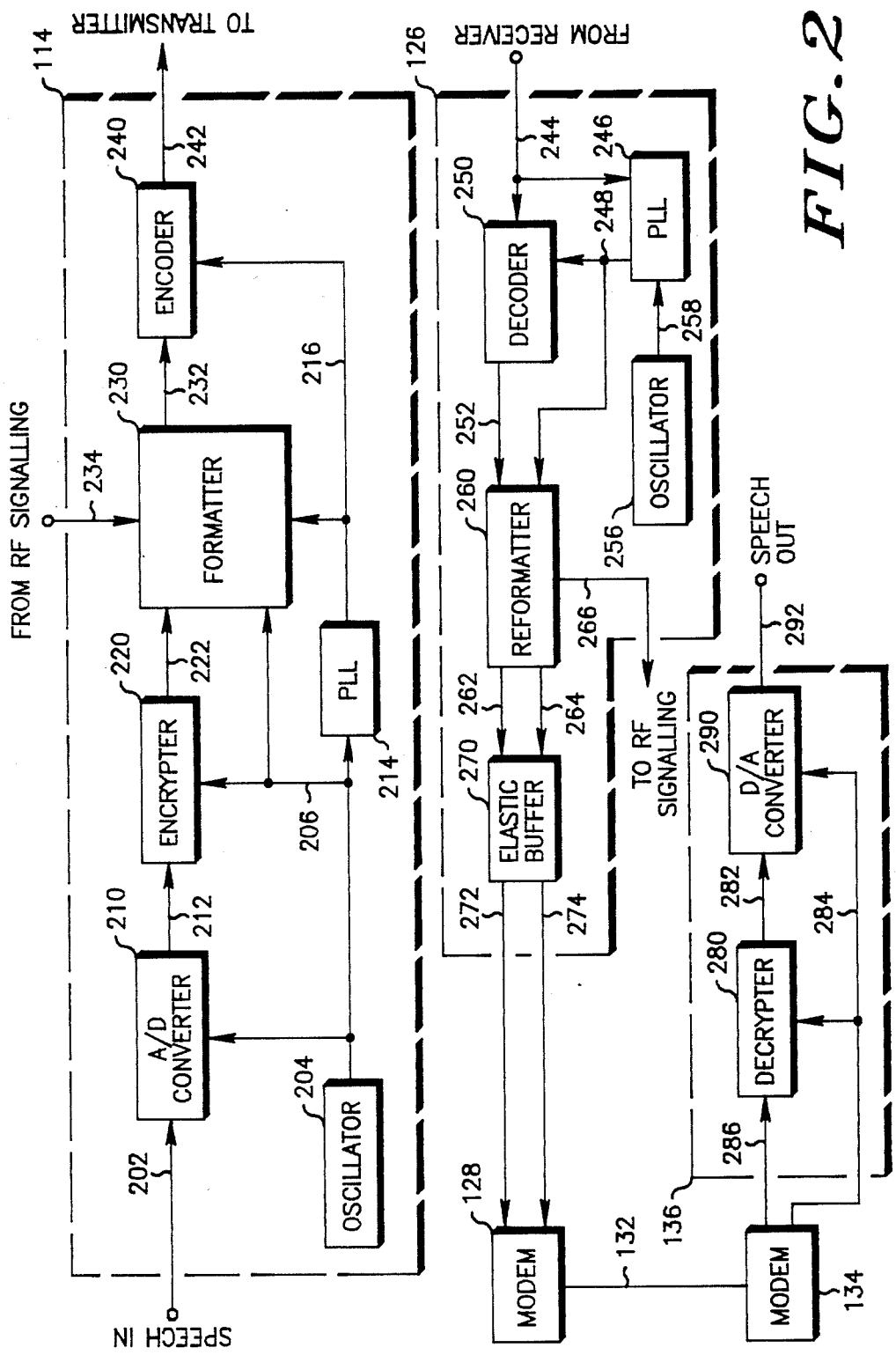

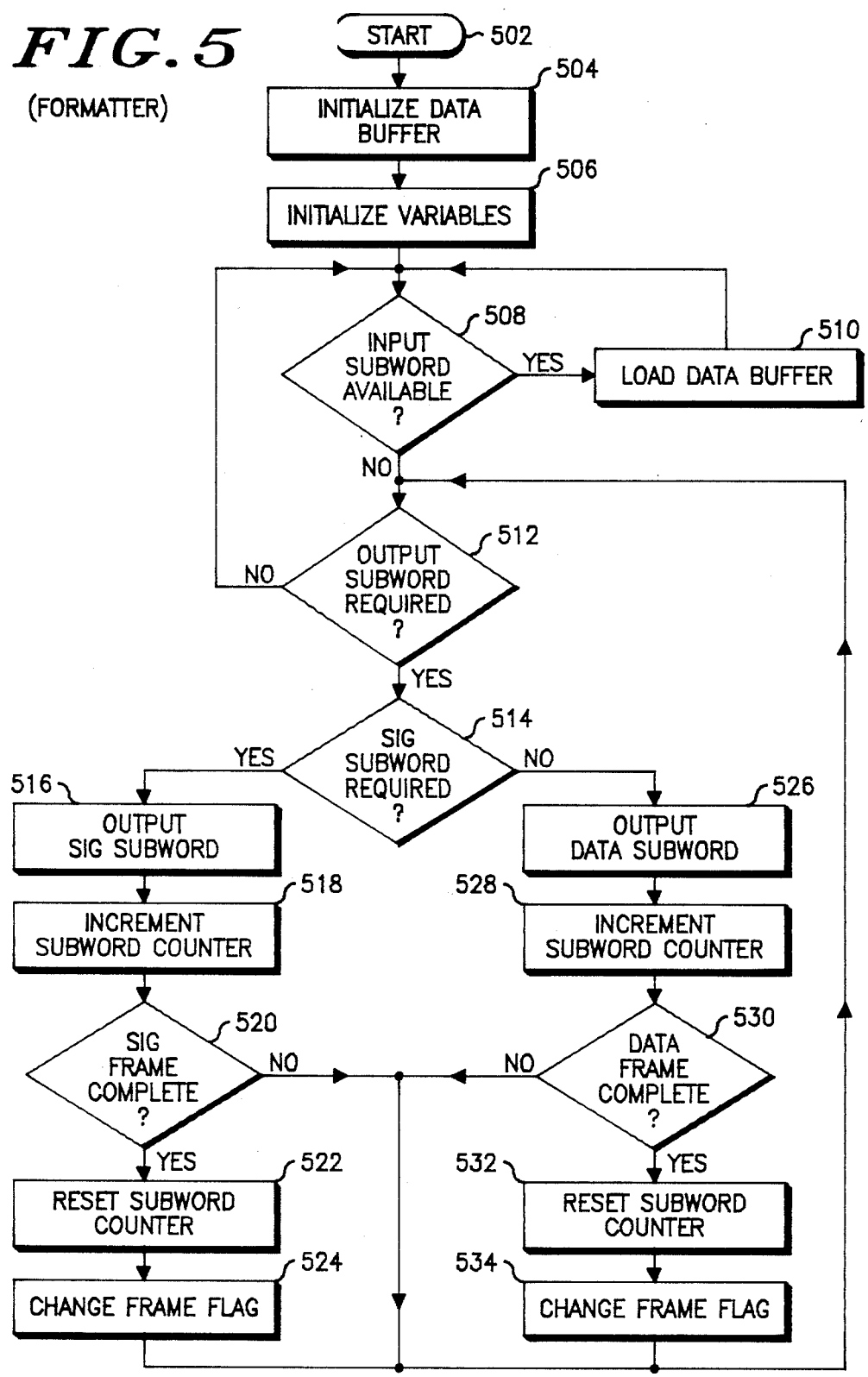

(REFORMATTER)

(ELASTIC BUFFER)

FIG. 10G (852) — DELETED CLOCK PULSE / ADDED CLOCK PULSE

BIT SYNCHRONIZATION METHOD FOR A DIGITAL RADIO TELEPHONE SYSTEM

CROSS-REFERENCE TO RELATED APPLICATIONS

This application contains subject matter related to co-pending applications Ser. Nos. 771,460, and 771,458, now U.S. Pat. No. 4,649,543, both filed Aug. 30, 1985, and both assigned to the same assignee as the present application.

BACKGROUND OF THE INVENTION

1. Field of the Invention

The present invention generally relates to two-way radio communication systems. More specifically, the present invention pertains to maintaining bit synchronization of a digital data stream transmitted over a radio frequency (RF) channel in a mobile radiotelephone system.

2. Description of the Prior Art

One general goal of mobile radiotelephone systems is to provide system features corresponding to those of the landline telephone systems to which they interconnect. One such feature is the transmission of data from one location to another. Many telephone subscribers connect data communications devices, such as computer terminals, to the telephone system via a modem. Basically, modems convert the digital data to distinct tones or tone/phase relationships which can be transmitted by the landline telephone network. Accordingly, a desired feature would be to have the ability to connect such devices, via a modem, through the landline telephone network, to a radiotelephone subscriber unit having a similar data communications device.

Those skilled in the radio art will appreciate the reasons why previous attempts to provide this interconnection have yielded unsatisfactory results. Rapid multipath fading, commonly experienced in high frequency radiotelephone communications, causes significant amplitude and phase changes in modem-generated tones such that data carried by the radio channel becomes garbled or missing.

Furthermore, system signalling requirements, e.g., a handoff between cells of a cellular radiotelephone system (which is virtually unnoticeable during a voice conversation), becomes a formidable obstacle during data communications. This particular limitation has been resolved by converting the input data to a format compatible with radio channel transmission, and reconverting the radio channel data back to the original format upon reception. The data transmission is halted prior to a handoff and is resumed after the handoff is completed. A detailed descripTion of the above process may be found in U.S. Pat. No. 4,654,867 by Labedz, et al. and assigned to the assignee of the present invention.

A second feature of landline telephone systems which subscribers of a radiotelephone system desire is that of security of their conversations. Digital scrambling techniques, which render a message unintelligible to prevent unauthorized reception, have been disclosed in U.S. Pat. Nos. 4,167,700; 4,434,323; and 4,440,976; each assigned to the assignee of the present invention. Typically, a voice message is digitized and processed through an encryption device to produce a signal that is random or pseudo-random in nature, thus appearing noise-like to the unauthorized receiver The particular encryption algorithm used by the encryption device may be a proprietary algorithm, or may be based on a Government standard (e.g. D.E.S.).

Additional obstacles must be overcome in order to accomplish secure voice communications via digital encryption of speech in a radiotelephone system. First, the aforementioned signalling requirements of the radiotelephone system must be addressed. This typically translates into additional overhead data words that must be transmitted concurrently with the digital voice signals. For example, digital speech at 9.6 kilobits per second (kbps) may be combined at the mobile unit with 400 bps signalling information and transmitted over the RF channel at a 10 kbps data rate, as described in the aforementioned related applications. The base site unit removes the signalling word and sends only the 9.6 kbps digital voice to the landline user. A standard 9.6 kbps modem can then be used to transmit the data over the telephone line, which appears to solve the problem.

However, the decryption of digitally-encrypted speech presents additional problems. It is generally known to operate an encryption device in a cipher feedback (CFB) mode, wherein the encrypted text output signal is added (modulo 2) with a plain text input signal. Those skilled in the art will appreciate that the wide utilization of the CFB-mode of operation was due chiefly to the self-synchronizing nature of the signal. However, CFB-mode devices operating over an RF link suffer a serious detriment in that the receiving units have a reduced operational range. The range reduction is caused by error multiplication in the CFB descrambler associated with receiver sensitivity. The error multiplication is fundamental to the CFB concept, since an erroneously-received bit is is fed back to the decryption device input until the error finally "clears" or propagates out.

Numerous bit errors are introduced by Rayleigh fades, which are caused by the mobile unit traveling through the multipath interference patterns generated by reflection from obstacles near the transmitting equipment. Hence, the receiving unit must remain within a given proximity of the transmitting unit in order to maintain the high signal-to-noise ratio necessary to preclude receiving erroneous data bits. Although the CFB descrambler will eventually re-synchronize itself, the numerous errors in the output text stream could mean a missed message or faulty data.

A second scrambling technique, the counter address (CA) mode of encryption, does not suffer from the error multiplication problem characteristic of the CFB-mode operation. "Counter addressing" means that the device implementing the selected encryption algorithm is fed a pseudo-random sequence to generate the key stream, which is used to encrypt the plain text message. In this way, the encryption device is "addressed" by the pseudo-random counter. However, continuous bit synchronization from the scrambler to the descrambler is required to allow proper operation of the CA-mode descrambler key generator without requiring periodic key generator data transfers. Continuous bit synchronization, as used herein, means that the number of bits into the transmission channel is equal to the number of bits recovered from the channel, and that the average data rate into the channel is equal to the average data rate out of the channel.

Bit synchronization over an RF transmission path is very difficult to maintain, primarily due to Rayleigh fading. Any method of continuous bit synchronization must withstand RF phase jumps, channel fading, drift between RF and landline modem clocks, and bit slippage due to an out-of-lock phase-locked loop (PLL) at the mobile or base site.

Known techniques for maintaining bit synchronization involve a series of tradeoffs when used over an RF channel. One method is to utilize additional overhead bits toperiodically re-initialize th pseudo-random number generators of the scrambling devices. However, the use of any additional overhead means that a substantial penalty is paid for the reduced data rate of the voice signal as compared to that which is possible on a fade-free channel. If radiotelephone system signalling overhead is also required, the further reduction in overall data rate would significantly degrade the quality of the digitized speech. Conversely, CFB-mode encryption may be used with its error multiplication and range reduction limitations.

A further problem involves maintaining bit synchronization through standard modem which typically have tight specifications with respect to clock and data input tolerances. For example, a standard V.32 modem requires a 9.6 K±100 parts-per-million (ppm) input data rate. Hence, any differences between the mobile unit's data transmission clock frequency and the modem clock used at the base site must be compesated for, while still maintaining the bit integrity of the channel. Furthermore, when any overhead signalling words are removed from the data stream, the clock and data must be buffered for transmission by the modem—again while maintaining continuous bit synchronization.

A need, therefore, exists to provide a way to maintain continuous bit synchronization in an RF channel, from the mobile unit through the base site to the landline unit, while remaining compatible with standard landline data transmission equipment.

SUMMARY OF THE INVENTION

Accordingly, a general object of the present invention is to provide a method and means for maintaining continuous bit synchronization of data transmitted via an RF channel.

Another object of the present invention is to maintain such continuous bit synchronization for encrypted digital speech without requiring additional overhead synchronization words.

A further object of the present invention is to provide such bit synchronization while maintaining compatibility with standard landline modems.

These and other objects are achieved by the present invention which, briefly described, is a method for providing bit synchronization of an input data stream to an output data stream over a data transmission path, such as an RF link, having digital signalling capabilities. An input data stream, such as digitized or encrypted speech, is accepted at a first bit rate along with a plurality of signalling words containing system signalling information. The signalling words are then interleaved with a predetermined number of data bits of the input data stream to provide a combined data message having a second, typically higher, bit rate, which is transmitted and received via the data transmission path. A clock is recovered from the received data message through the use of a phase-locked loop, which may have unlocked during an RF fade. The signalling words are then separated from the received data message, thus leaving raw data words having an instantaneous data rate corresponding to the recovered clock. The number of bits in the raw data word is then modified to approximate the predetermined number of data bits originally interleaved with the signalling words. The recovered clock rate is also modified to correspond to the first bit rate, by adding and deleting clock pulses. Finally, the modified clock and data are fed into an elastic buffer which time-aligns the data bits with a stabilized clock rate, thereby providing an output data stream which is not only in bit synchronization with in input data stream, but is also modem compatible.

In the preferred embodiment of a radiotelephone system using digital scrambling, analog speech at the mobile is converted to a 9.6 kbps data stream by sub-band coding (SBC), encrypted, and fed into a "formatter" device. Digital signalling words, comprising 21 bits of 400 bps data, are then periodically added to 504 bits of the encrypted speech data and transmitted over the RF channel as 10 kbps Manchester-encoded data. (The ratio of 10/9.6 is equal to (504+21)/504, such that the 10 kHz and 9.6 kHz data clocks may be locked to each other to maintain bit synchronization upon transmission.) The 10 kbps Manchester data is decoded at the base site, where the 400 bps signalling word is detected, decoded, and stripped off in a "reformatter" device. The reformatter outputs 504 data bits between signalling word detects even if a fade caused too many or too few data bits to be received. Thus, although the data may be erroneous if the PLL slipped a bit upon clock recovery, complete bit synchronization with the mobile is maintained. The resulting 10 kbps data bursts of encrypted speech are subsequently fed into an elastic buffer, which outputs a 9.6 kHz clock and 9.6 kbps data in continuous bit synchronization with the 9.6 kHz clock in the mobile, but not phase-locked. These clock and data signals are then suitable for a standard modem pair to send over the land telephone lines.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like-referenced numerals identify like elements, and in which:

FIG. 2 is a detailed block diagram of the signal processing blocks of the mobile, base, and land units of FIG. 1 in accordance with the present invention;

FIG. 5 is a simplified flowchart diagram illustrating the general sequence of operations performed by the formatter microprocessor in accordance with the practice of the present invention;

FIG. 10 represents waveform diagrams illustrating the timing relationships of the clock rate adjuster hardware of FIG. 8.

DETAILED DESCRIPTION OF THE PREFERRED EMBODIMENT

Figure 1:
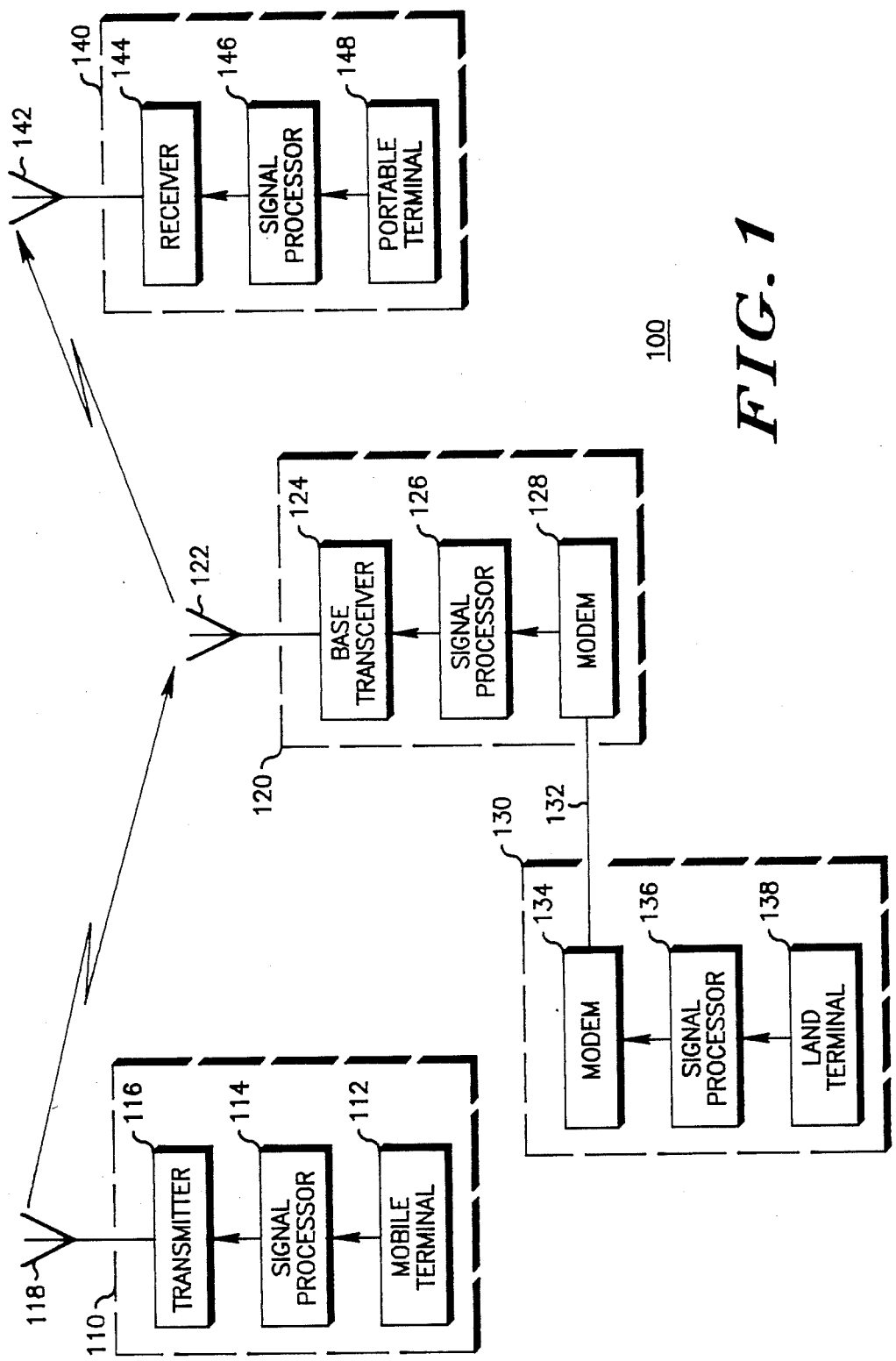
FIG. 1 is a general block diagram of a mobile radio communication system for use with the present invention.

FIG. 1 illustrates multi-site radio system 100 which may be used with the present invention. The system is essentially comprised of mobile unit 110 and/or portable unit 140, base station unit 120, and landline unit 130. As used herein, a portable unit is defined as a radio typically carried about a person; a mobile unit is carried in vehicles; and a base station unit is typically a permanent or semi-permanent installation at a fixed location. Mobile units and portable units are hereinafter collectively referred to as remote units. Although the present invention was intended for use in a cellular mobile radiotelephone system in which all stations transmit and receive in the duplex mode, it is contemplated that receive-only or transmit-only devices may be readily implemented. Such receive-only devices capable of operating in communication system 100 include, but are not limited to, data display pagers, tone pagers or tone-and-voice pagers. For purposes of understanding the operation of the present invention, such receive-only and transmit-only devices are illustrated in FIG. 1.

Remote units 110 and 140 communicate with base unit 120 via radio frequency (RF) channels. Depending on the particular system implementation, the channels may be allocated according to geographical divisions (cellular radiotelephone systems), time divisions (time-division multiplex systems), or frequency divisions (frequencydivision multiplex systems) Although not required for understanding of the present invention, a description of a compatible cellular radiotelephone system may be found in the aforementioned cross-referenced applications.

In the preferred embodiment, mobile unit 110 generates speech or data to be transmitted to land unit 130 in mobile terminal 112. This terminal generates an information signal, such as an analog voice signal or a digital data signal, to signal processor block 114. This block, which will be more fully described in FIG. 2, converts the analog voice to a digital data stream, adds signalling overhead, and outputs the combined data message to transmitter 116. Transmitter 116 may be any suitable transmitter compatible with the chosen system format. A mobile terminal and transmitter which may be used in the present invention is described in Motorola instruction manual 68P81070E40 entitled "Dyna T.A.C. Cellular Mobile Telephone".

The combined signalling/data message is transmitted over the RF channel via mobile antenna 118 and received at base antenna 122. Base transceiver 124 receives the transmitted data message by demodulating the RF carrier in a manner compatible with the system implementation. A representative base station transceiver is described in the Motorola instruction manual 68P81052E50 entitled "Dyna T.A.C. System Fixed Network Equipment". The received data message is then applied to signal processor 126. Again, the signal processor circuitry will be described fully in conjunction with FIG. 2. Basically, however, signal processor 126 decodes the received data message, recovers the clock from the data message, removes the signalling words from the message, and buffers the data and clock to be applied to modem 128. In the preferred embodiment, modem 128 is a V.32 full-duplex 9.6 kbps modem manufactured by Codex, a subsidiary of Motorola, Inc.

Modem 128 sends the received data message to modem 134 via landline 132. Signal processor 136 of land unit 130 accepts the data message, descrambles any encrypted voice messages, and re-converts digitized speech to an analog waveform for use at land terminal 138. Therefore, it can now be appreciated that any bit synchronization technique utilized must be compatible with RF transmission paths as well as landline transmission paths.

Portable unit 140 operates in a similar fashion Land terminal 138 generates, and signal processor 136 encrypts, a digital message which is sent via modem 134 through landline 132 to base site 120. Signal processor 126 adds signalling overhead to the data obtained from modem 128. Transceiver 124 of the base site then transmits the message via the RF path to portable antenna 142, and the data message is received at portable receiver 144. Signal processor 146 then performs the reformatting and buffering functions of base unit signal processor 126, as well as the decryption and speech conversion functions of land unit signal processor 138. Portable terminal 148, like land terminal 138, accepts the received data message and suitably presents it to the user. A representative receiver and portable terminal may be found in Motorola instruction manual 68P81071E55 entitled "Dyna T.A.C. 8500XL Cellular Portable Telephone".

FIG. 2 illustrates the signal processor blocks 114, 126, 136 of mobile unit 110, base unit 120 and land unit 10, respectively. As previously mentioned, signal processor 146 is similar in function and operation to a combination of signal processor 126 and 136, and thus need not be independently shown. The following description of the preferred embodiment is illustrative of 9.6 kbps signal processing of speech for radio frequency transmission. However, those skilled in the communications art will appreciate that the present invention may also be used at any data rate on various types of input signals over other transmission mediums Analog speech is applied to input terminal 202 of signal processor 114 of the mobile Analog-to-digital (A/D) converter 210 transforms the analog waveform into a 9.6 kbps data stream at 212, using the 9.6 kHz clock signal at 206. A/D 210 may be any suitable device which provides a digital representation of the voice signal, such as: a Continuously Variable Slope Delta (CVSD) modulator, e.g., an HC-55516/55532 device manufactured by Harris Semiconductor; or a sub-band coder (SBC), such as described in the article by R. E. Crochiere and J. L. Flanagan entitled "Sub-Band Coding of Speech", *International Conference on Communications* 1977, vol. 1, June 12-15, 1977, pp. 293-296; or Linear Predictive Coding (LPC), as known in the art. Mobile reference oscillator 204 generates the stable 9.6 kHz clock signal, which is available via line 206 to various blocks of the mobile. Oscillator 204 may also be used with the mobile's RF carrier-generating circuitry.

The digital speech signal at 212 is applied to encrypter 220, which digitally scrambles the information signal producing a random or pseudo-random encrypted signal at line 222 for use by formatter 230. Any digital encryption device may be used as encrypter 220. However, to achieve the full advantages of the present invention, the encryption device should operate in the counter-addressing mode or the output-feedback mode. These encryption schemes are described in the articles "Privacy and Authentication: An Introduction to Cryptography" by W. Diffie and M. E. Hellman, *Proceedings of the IEEE*, vol. 67, no. 3, March 1979, pp. 397–427, and "D.E.S. Modes of Operation", Federal Information Processing Sandards (FIPS) Publication no. 81, published by the National Bureau of Standards.

Phase-locked loop (PLL) 214 generates a second clock signal on line 216 that is synchronized with the mobile oscillator clock signal on line 206. For example, the 9.6 kHz input clock could be phase-locked to a 10 kHz output clock via tapping off of various divider networks in the PLL. Alternatively, oscillator 204 and PLL 214 could be replaced by a single high frequency oscillator with various dividers to provide synchronized clocks of different frequencies Either way, the 9.6 kHz and 10 kHz clocks must be in frequency synchronization.

Formatter 230 serves to interleave a predetermined number of data bits of the encrypted speech accepted from line 222 with an RF signalling word of a given length available from line 234. In the preferred embodiment, 504 bits of speech data at 9.6 kbps are accepted as a data word, which is interleaved with a 21 bit RF signalling word taken from memory. The number of data bits in the preferred embodiment was specifically chosen to accommodate a 10 kbps channel data rate, a 9.6 kbps input data rate, and a 21 bit signalling word. The ratio of 504 data bits plus 21 signalling bits (525 bits), to 504 data bits, equals the ratio of the 10 kHz output clock at 216 to the 9.6 kHz input clock at 206. In this way, the 10 kHz and 9.6 kHz data rates may be synchronized with each other. Using these numbers, the continuous 9.6 kbps input data rate is essentially added to a 400 bps "effective" signalling data rate and output as a 10 kbps output data rate. It should be noted that the specific number of bits chosen to implement this scheme is not limited to the above numbers. On the contrary, the concepts of the present invention may be applied to any data transmission system having similar digital signalling capabilities.

Figure 4:
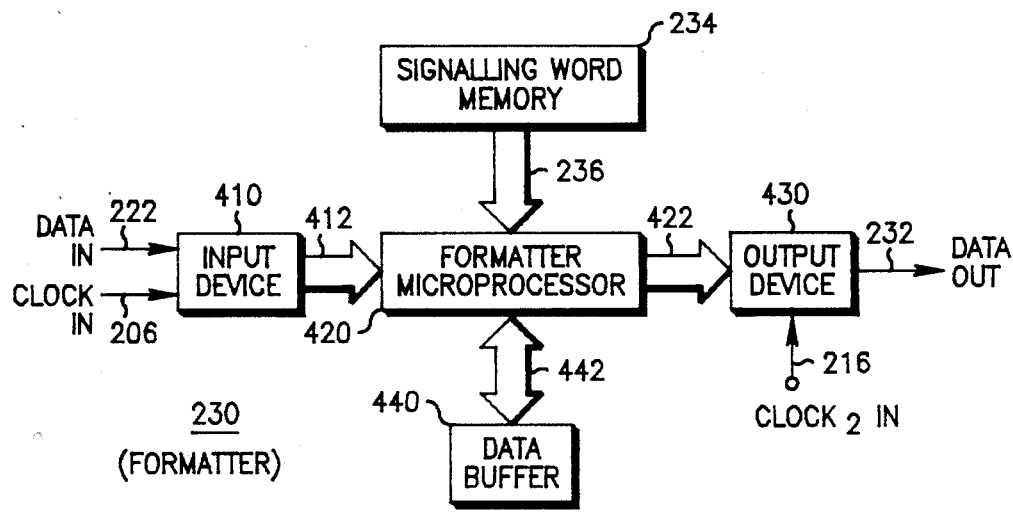
FIG. 4 is a block diagram of the signal processing formatter block of the mobile unit according to FIG. 2.

In the preferred embodiment, the function of formatter 230 is performed in software in a microprocessor as described in FIGS. 4 and 5. Alternatively, various hardware representations, e g., a time-controlled switch, may also be used.

The 10 kbps combined data message at 232 is clocked into encoder 240 by clock signal 216. Encoder 240 functions to add the 10 kHz clock at 216 to the data for split-phase data transmission at 242 such that a clock signal may be more easily recovered at the receiver. In the preferred embodiment, encoder 240 is a conventional Manchester data encoder such as the type described in FIG. 6 of the aforementioned related applications. However, it is contemplated that the non-return-to-zero (NRZ) data from 232 may be output directly as transmitter data 242. Various other types of encoders may also be used, such as Gaussian minimum-shift keying (GMSK), depending upon system requirements. The 10 kbps Manchester data at line 242 is applied to mobile transmitter 116 for transmission to the base unit.

When received by the receiver section of base transceiver 124, the combined data message is applied to decoder 250 of base unit signal processor 126 via line 244. Decoder 250 utilizes phase-locked loop 246 to recover the transmitted 10 kHz clock. Base oscillator 256 applies a high frequency reference signal at 258 to PLL 246, which generates a 10 kHz clock signal to be phase-locked to the incoming 10 kHz Manchester-encoded data. The phase-locked 10 kHz signal is then applied to decoder 250 via line 248 as the recovered clock signal. The phase-locked 10 kHz clock is also applied to the reformatter via line 248. Decoder 250, the compliment of encoder 240, decodes the combined data message and applies the decoded data to reformatter 260 via line 252. A representative Manchester decoder is described in the article entitled "Drop Your Costs . . . with a Manchester-Data Decoder" by J. J. Norton, *Electronic Design*, July 19, 1979, pp. 110–16.

Reformatter 260 performs three basic functions (1) removes the RF signalling word from the combined data message and sends it to RF signalling circuitry via line 266; (2) modifies the number of data bits between detected (or anticipated) signalling words to equal the number of data bits transmitted (i.e., 504), and outputs "raw" data words at 262; and (3) modifies the clock rate of the recovered clock signal at 254 to provide a "bursted" (raw) clock signal at 264 having an effective clock rate of 9.6 kHz. To maintain bit synchronization, it is essential that the reformatter correct the number of data bits between detected signalling words regardless of the actual number of bits received; since, if a fade occurs on the RF channel, PLL 246 could drift off frequency and provide too few or too many clocks. (See FIG. 3.) Once the fade is over, the signalling word correlator in the reformatter can again determine where the signalling word detect should be. A window counter in the reformatter keeps track of where the signalling word should be, even if a fade causes several signalling words to be missed If PLL 246 in the clock recovery circuit speeds up during the fade, too many bits will be received, and the signalling word will be detected later than expected. In this case, the reformatter corrects for this occurrence by deleting the appropriate number of data bits. If PLL 246 slows down during the fade, too few bits will be received, and signalling word detection will come earlier than expected The reformatter will accordingly correct by sending additional data bits during the blank time slot from which the signalling word was removed. In summary, reformatter 260 outputs the correct number of data bits even if a fade caused too many or too few data bits to be received. The function of reformatter 260 is further described in FIGS. 6 and 7.

Raw data words, each having an instantaneous 10 kbps data rate, are input from line 262 into elastic buffer 270. The intermittent ("bursted") 10 kHz clock is also input to elastic buffer 270 via line 264. Elastic buffer 270 functions to adjust both the clock and data rates to match the tight specifications required to input the data into modem 128. For example, if modem 128 was a V.32 full-duplex 9.6 kbps modem, output data at 272 and output clock 274 must be sent at precisely 9.6 kbps ±100 ppm (i.e., ±0.96 Hz.). The elastic buffer delays the data by performing the function of a variable length shift register. The buffer attempts to keep the data in a middle range of the register by slowing down its 9.6 kHz output clock if the buffer size gets below a certain value, and by speeding up the 9.6 clock if the buffer size gets above a certain value. Hence, the buffer matches the discontinuous 10 kHz clock to a continuous 9.6 kHz clock with a frequency that is locked to the effective 9.6 kbps data rate. Furthermore, any frequency difference between the 9.6 kHz clock at the mobile and the 9.6 kHz clock in the elastic buffer is taken into account in this manner. The frequency offset utilized in the elastic buffer must be wide enough to allow for the maximum frequency difference (due to drift) between the clocks, but not so wide as to exceed the frequency specification of the modem. Elastic buffer 270 will be further described in FIG. 8 et seq.

The 9.6 kbps encrypted data is then sent to the land unit signal processor 136 via modem 128, landline 132, and modem 134. The 9.6 kHz data available at line 286 is descrambled via decrypter 280 utilizing the 9.6 kHz clock at 284 sent with the data. The decryption algorithm used in decrypter 280 must, of course, correspond to the encryption algorithm of encrypter 220. A decryption scheme illustrative of that used in the present invention is described in the previously-noted encryption references. The plain text data stream at 282 is clocked into digital-to-analog (D/A) converter 290 via the clock signal at 284, and fed to land terminal 138 as analog speech via line 292. A representative D/A converter would be the aforementioned CVSD device.

In review, it can now be appreciated that three fundamental blocks are used to provide the continuous bit synchronization scheme of the present invention: formatter 230; reformatter 260; and elastic buffer 270. Complete bit integrity is maintained over the RF channel without utilizing additional overhead for decryption re-synchronization, while maintaining compatibility with standard landline equipment.

As described in the aforementioned related specifications, the preferred embodiment utilizes a 21-bit correlation signalling word providing both frame synchronization and supervisory audio tone (SAT) information. Various 21-bit correlator words have been developed for the combined SAT/SYNC (S/S) function in the preferred embodiment The chosen correlator words provide high autocorrelation properties (i.e., a 21-bit match when the word is aligned in the correlator and less than or equal to a 2-bit match when the word is not aligned), and low cross-correlation properties (less than or equal to a 6-bit match) Hence, SAT is continuously sent by transmitting the proper signalling correlator word.

Referring now to FIG. 3, various timing diagrams are shown to illustrate how the present invention corrects for slipped bits to maintain bit synchronization. The various diagrams (A-F) of FIG. 3 correspond to data signas at various points of FIG. 2. FIG. 3A shows the encrypted data signal available to formatter 230 on line 222. This formatter input signal consists of encrypted data at a constant 9.6 kbps data rate. Although the formatter input is shown in the figure as consisting of repeating segments of 504 bits, no frame boundaries have yet been defined FIG. 3B illustrates the combined signalling word/data word message at the formatter output 232 which is eventually transmitted at 10 kbps. Formatter 230 has interleaved 21-bit signalling words (S/S) with 504 bits of the formatter input data stream. One signalling word (S/S)/data word message unit is called a frame. The frames repeat such that the formatter output is at a 10 kbps data rate. The number of data bits, i.e., 504, was chosen as a function of the number of bits of signalling word required for the system, the input data rate, and the output data rate. In the preferred embodiment, these factors were predefined by system requirements.

Hence, 21-bits of 400 bps signalling information had to be combined with a predetermined number of 9.6 kbps data bits to provide an output message data rate of 10 kbps. As noted above, the ratio of 10 kbps/9.6 kbps determined the ratio of (504+21)/504.

Figure 3A:
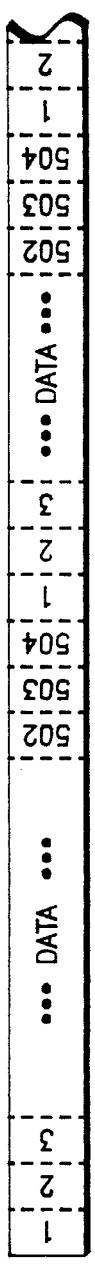
FIG. 3 is a timing diagram of data messages at various points of FIG. 2, illustrating the signalling and data word formats employed in the preferred embodiment.
Figure 3B:
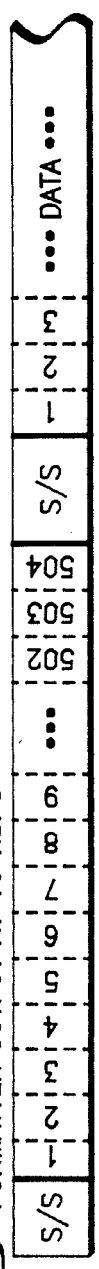
Figure 3C:
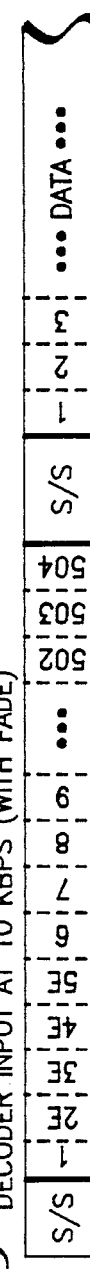

FIG. 3C illustrates the received message derived from the RF channel and applied to the decoder input via line 244. The input data rate is that of the transmitted message, i.e. 10 kbps. If, however, an RF fade has occurred during transmission (see, for example, bits 2 through 5), two problems arise: (1) the information content of these faded bits is lost; and (2) the possibility exists that the clock recovery circuit could have drifted to cause bit slips Each of these problems is addressed below.

Figure 3D:
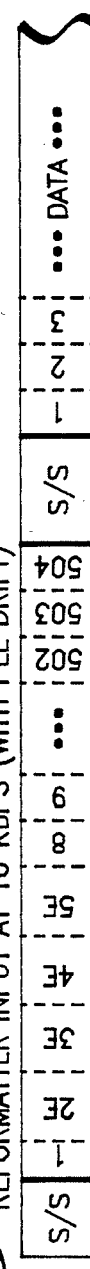
Figure 3E:
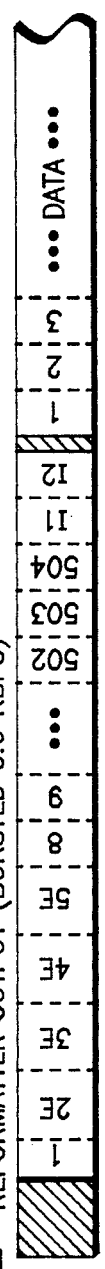

The reformatter input at line 252 is illustrated in FIG. 3D. The figure illustrates the possibility of the phase-locked loop in the clock recovery circuit drifting during the fade. If, for example, the PLL clock slowed down, the drift would effectively stretch the length of bits 2 through 5 as shown. When the phase-locked loop recovers lock, the content of bits 6 and 7, for example, would have been lost. Hence, the PLL drift has caused a bit slip of two bits. However, decoder 250 cannot indicate to reformatter 260 that a bit slip has occurred. Hence, if not corrected, this bit slip would propagate through the system to decrypter 280, which would then forever be out of bit synchronization with encrypter 220. Therefore, reformatter 260 provides the critical function of inserting or deleting bits to re-synchronize the received message Briefly, reformatter 260 performs this function by inputting a predetermined number of data bits after a signalling word correlation has been detected. A window counter in reformatter 260 keeps track of where the signalling word detect should be even if the fade causes several signalling word detects to be missed. If the PLL speeds up during the fade, too many bits will be input to the reformatter, and the reformatter must delete the extra bits. If the PLL slows down during the fade, as illustrated in FIG. 3D, too few bits will be input, and reformatter 260 must add additional bits to meet the required predetermined number As illustrated in FIG. 3E, these added bits are obtained from the first bits of the signalling word. In the example shown, after the signalling word is stripped off, individual raw data words having an instantaneous, or "bursted", 10 kbps data rate remain. The reformatter had to insert two additional bits, taken from the first few bits of the discarded signalling word, to output 504 total bits since the last signalling detect. Hence, the reformatter output consists of 504 bits of data, whether or not there was a bit slip.

If a fade causing a PLL drift had occurred, the faded bits in error, bits 2E-5E, are output in their proper time slots (see FIG. 3E). However, since bits 6 and 7 were lost due to the PLL drift, the following bits, 8, 9, . . . 502, 503, 504 will subsequently be output as slipped bits. Furthermore, an additional two bits of data, I1 and I2, are inserted after bit 504. However, a total of 504 bits is always output from the reformatter between detected (or anticipated) signalling word correlations.

Figure 3F:
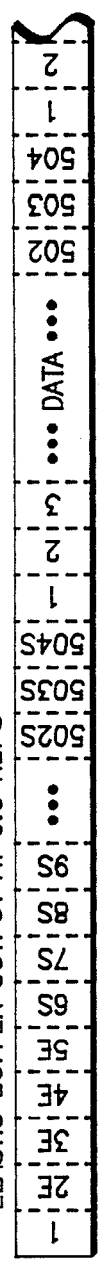

The elastic buffer output is illustrated in FIG. 3F. This timing diagram represents the output data stream available on line 272, which is eventually decrypted. Note that the data stream is time-aligned to maintain a tight-tolerance 9.6 kbps data rate. Further note that reformatter output bits 8 and 9 have been slipped into the position of lost bits 6 and 7. Although bits 2E through 5E are erroneous due to the fade, and bits 6S through 504S have slipped due to the PLL drift, bits 1, 2, 3, etc. of the next frame have regained bit synchronization with the input data stream. In other words, the elastic buffer output only contains erroneous data for the portion of the frame or frames affected by the fade.

Referring now to FIG. 4, formatter block 230 of the mobile signal processor block 114 is shown. The encrypted 9.6 kbps data stream on line 222, and the mobile's 9.6 kHz clock on line 206, are both applied to input device 410 for serial-to-parallel conversion. In the preferred embodiment, input device 410 is a synchronous serial data adapter (SSDA), which interfaces the 9.6 kHz clock and data to microprocessor bus 412. A Motorola MC6852 SSDA is used in the preferred embodiment. The input data from input device 410 is periodically loaded into data buffer 440 for later use.

Microprocessor 420 performs the actual process of interleaving the 21-bit signalling words, input from signalling word memory 234 via data bus 236, with 504 bits of input data, available from data buffer 440 via data bus 442. The flowchart of FIG. 5 will illustrate how this interleaving process is performed. The combined data message is then output via data bus 422 to output device 430, another SSDA, which converts the parallel data to a serial data stream at 232. However, output SSDA device 430 is clocked at the 10 kHz clock rate available from PLL 214 via line 216. In the preferred embodiment, microprocessor 420 is a Motorola MC6809 8-bit microprocessor. Signalling word memory 234 is a Motorola MCM68764 8Kx8 erasable programmable read-only-memory (EPROM), and data buffer 440 is a Motorola MCM6116P12 2Kx8 random-access-memory (RAM).

Referring now to FIG. 5, the steps performed by formatter microprocessor 420 are illustrated in flowchart form. Beginning at start block 502, data buffer 440 is first initialized to accept input data from input device 410 in block 504. Block 506 initializes variables subsequently used in the formatter operation. For example, a frame flag would be initialized to first output a sync word before outputting a data word in the frame. Additionally, a word counter would be initialized to determine how many bits comprise a signalling word or data word. The addresses of the signalling words in memory are also initialized in this block.

In the preferred embodiment, the formatter periodically loads 7-bit "subwords" into the input and output SSDA's. These 7-bit subwords are utilized to conveniently accommodate the 21/504 bit-per-frame configuration of the preferred embodiment. (504/7=72, 21/7=3.) Furthermore, this subword arrangement also facilitates the use of an 8-bit SSDA.

When 7-bits of input data are available from input device 410, a subword can be transferred to data buffer 440. Hence, a "yes" decision in block 508, asking whether an input 7-bit subword is available, would then cause the subword to be loaded into the data buffer in block 510. Since the 9.6 kbps input data rate is slower than the 10 kbps output data rate, there will be some times when an input subword is not available. During those times, block 512 is entered. If the output SSDA is not ready for another subword, then control returns to block 508. When the output SSDA does require data for outputting at the 10 kbps data rate, a 7-bit subword must be transferred from the formatter microprocessor to the output SSDA. Block 514 then decides whether or not a signalling subword is required.

If a "yes" decision is made in block 514, block 516 outputs the signalling subword, indicated by the subword counter, to the SSDA. In block 518, the subword counter is incremented. In block 520, the subword counter is checked to verify that three 7-bit subwords (21-bits of signalling have been output). If all three have not been transferred, then control proceeds back to block 512 to output another signalling subword. If the signalling subword counter has reached three, meaning three 7-bit subwords have been output, then the 21-bit signalling word is complete. Block 522 would then reset the subword counter to one, and block 524 would then change the frame flag from indicating signalling subwords to indicating data subwords.

After the completed signalling word has been output, block 514 decides that a data subword should follow next. Hence, control proceeds from 514 to block 526 where a 7-bit data subword is unloaded from the data buffer and output to the SSDA. Block 528 increments the data subword counter, and block 530 compares the subword counter to the frame flag. If the frame is not complete, control is directed back to block 512. If 72 subwords of data have been output, then the subword counter is reset in block 532, and the frame flag is changed to again indicate signalling words, in block 534. In this manner the 21 bits of signalling words and 504 bits of data words are interleaved to provide an output 10 kbps data stream.

Figure 6:
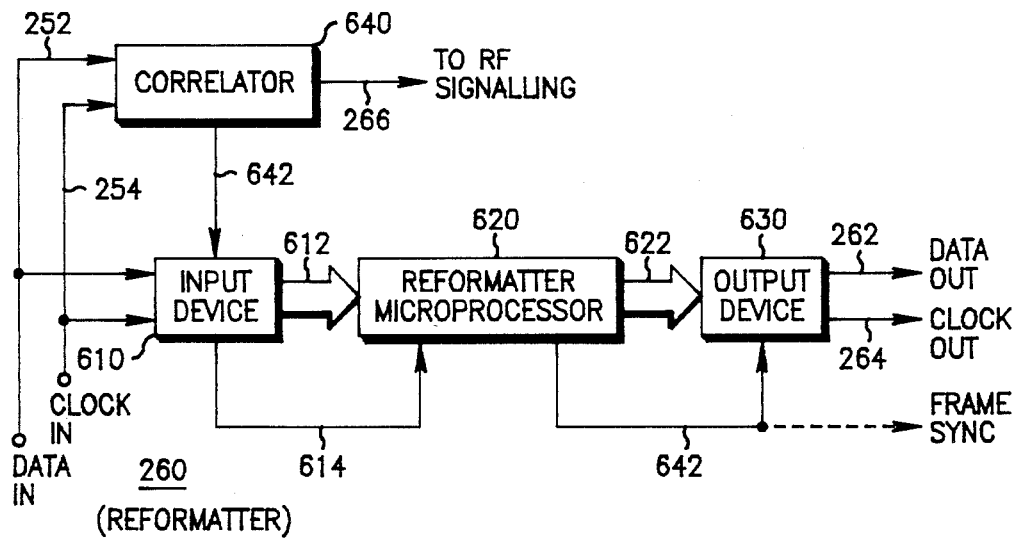
FIG. 6 is a block diagram of the signal processing reformatter block of the base unit of FIG. 2.

FIG. 6 illustrates a detailed block diagram of reformatter block 260 in the base station signal processor 126. As previously mentioned, the reformatter separates the signalling word from the data, and reformats the data if any slipped bits have occurred. The internal structure of reformatter 260 may be envisioned as being implemented by a correlator and a counter. Correlator 640 performs a correlation function between a known signalling word and the received data message, and provides a correlation detect signal on line 642 to input SSDA 610 whenever a valid correlation has occurred. A valid correlation clears the SSDA's receiver such that the SSDA will begin inputting a new subword with the first bit of serial data following the signalling word detect. Correlator runs substantially in parallel with processor 620 such that signalling correlations can be performed when reformatting, i.e., during the bit slip time. The signalling word detect decision is also output to RF signalling circuitry of the base station via line 266. The counter function is performed by reformatter microprocessor 620, in that it counts 504 bits between correlation detects. If bit slip has occurred, this counting procedure causes the addition or deletion of bits to or from the received data message.

The recovered 10 kHz clock at 254, and the decoded 10 kbps data at 252, are applied in parallel to correlator 640 and to input device 610, another SSDA. Device 610 converts the serial clock and data to a 7-bit subword for parallel processing in reformatter processor 620. The correlation decision is also fed to microprocessor 620 via "first word" line 614. This indicator tells the microprocessor to start counting 504 data bits; the signalling word bits being separated out by the processor since they occurred before the detect signal. FIG. 7 will illustrate how this separating process of the signalling word from the data word is achieved. The subwords of the data message are then applied to output device 630 via data bus 622. Output device 630, still another SSDA, outputs "bursted" 10 kbps data via line 262 to the elastic buffer. Similarly, an intermittent 10 kHz clock, having an effective 9.6 kHz clock rate, is derived from this data and output to the elastic buffer via line 264. Frame synchronization line 642 indicates to the elastic buffer that the first subword of a data word was just sent, thus providing a consistent reference point for the elastic buffer to adjust the clock rate. Correlator 640 may be implemented by a TDC1023 digital output correlator, available from TRW. Again, the SSDA's used may be Motorola MC6852 devices, and the microprocessor may be implemented by a Motorola MC6809.

Figure 7A:
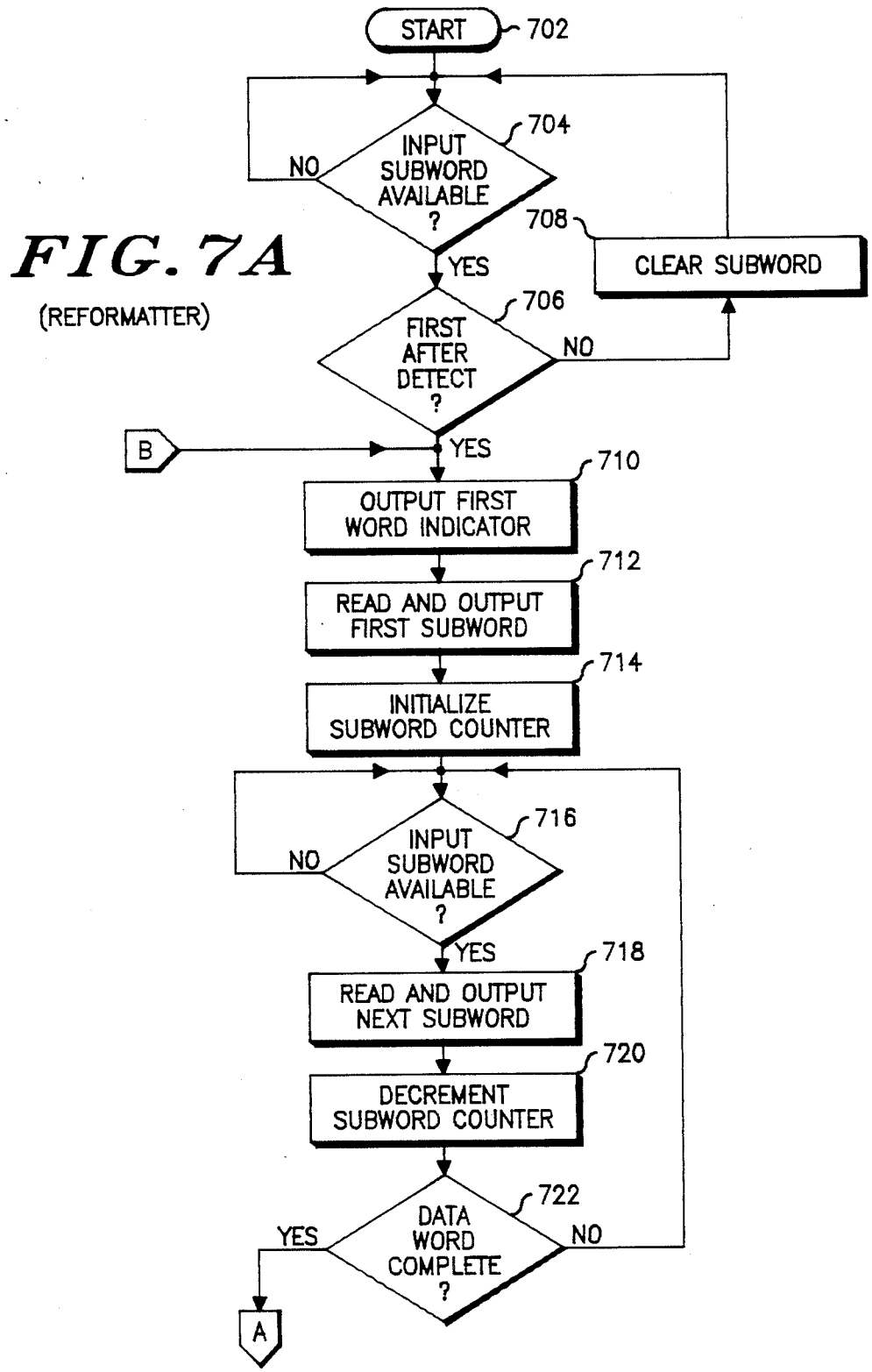
FIG. 7 is a simplified flowchart diagram illustrating the sequence of operations performed by the reformatter microprocessor of FIG. 6.

The reformatter flowchart of FIGS. 7A and 7B will now be described in conjunction with FIG. 6. Starting at 702, reformatter microprocessor 620 tests to see if an input subword is available from input device 610 in block 704. Again, the input subword consists of seven bits of parallel data converted from the 10 kbps serial input data. Input device 610 looks at the correlation detect line 642 to determine if the subword it is sending is the first seven bits after a valid correlation detect. If so, first word detect line 614 informs the microprocessor accordingly. The microprocessor monitors line 614 in block 706 to see if the input subword that is available is in fact the first subword after a detect. If not, the microprocessor clears the subword in block 608, and inputs another subword in block 704. If the subword is the first one after a valid correlation detect, then a first word indicator is output in block 710 as frame sync line 642. This frame sync information is also forwarded to the elastic buffer.

In block 712, the first subword is read from data bus 612 by microprocessor 620 and output as a first subword to output device 630 via data bus 622. After this first subword has been output, a subword counter is initialized in block 714 to keep track of the number of subwords that have been output. Block 716 tests to see if another subword is available from the input device SSDA, and if so, the next subword is read and output in block 718. The subword counter is then decremented in block 720, and tested in block 722 to see if all the subwords making up a complete data word have been output. If not, control returns to output another subword starting at block 716.

In the preferred embodiment, 72 subwords, each 7 bits in length, comprise a 504 bit data word. All 504 bits are sent to output device 630 whether or not the bits input from input device 610 are actually valid data. For example, inserted bits (I1 and I2 of FIG. 3E) are in fact the next few bits of the signalling word. Similarly, once a 504 bit data word is output, any extra data bits will be ignored. In this manner, the reformatter microprocessor modifies the number of data bits received with the signalling word to equal the number of data bits that were sent with the signalling word.

Figure 7B:
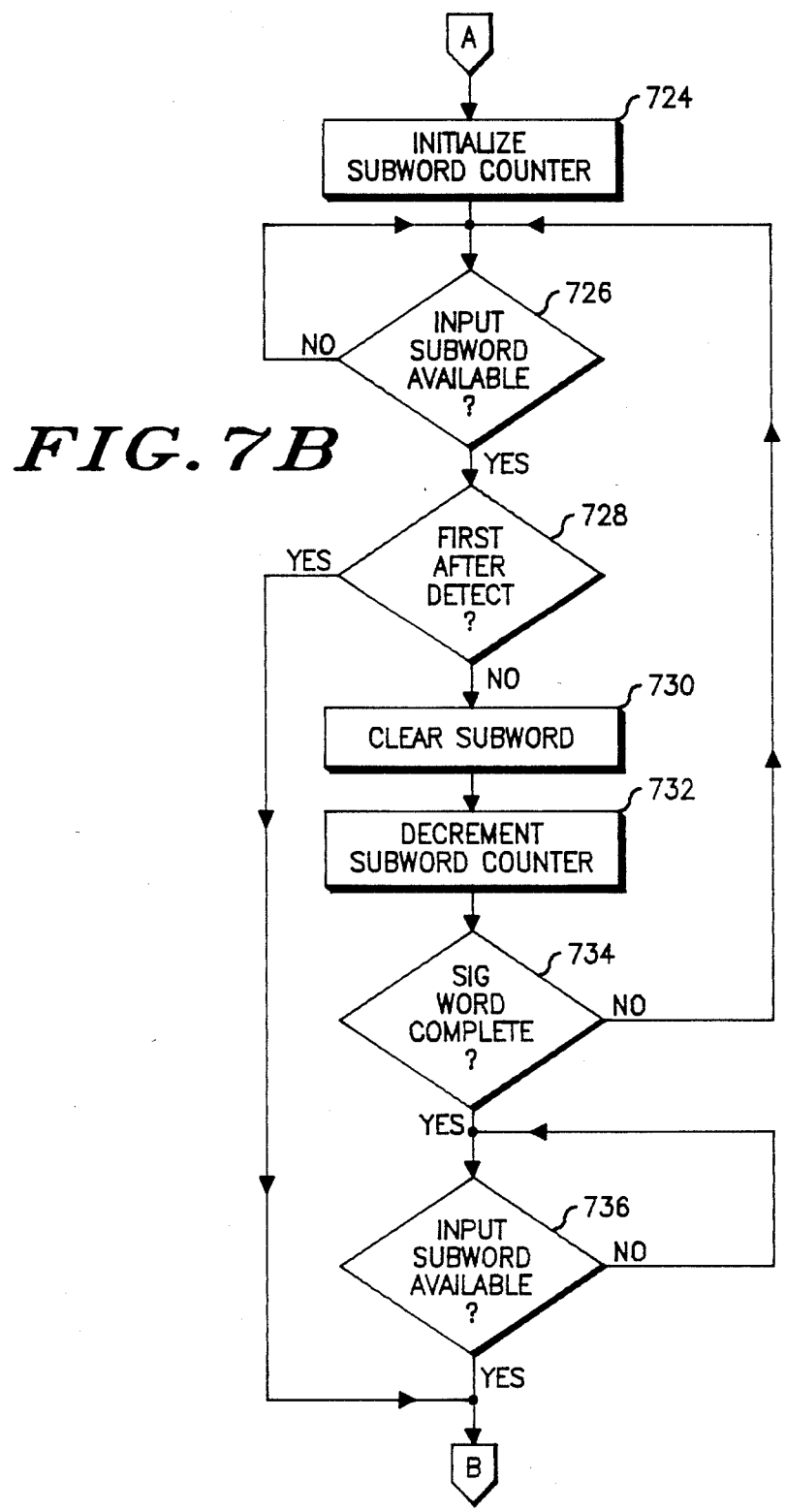

Continuing now with FIG. 7B, the subword counter is reinitialized in block 724 after 72 data words were output, to correspond to the number of subwords in a complete signalling word (e.g., three). As before, the microprocessor tests if the input subword is available in block 726, and if so, then tests if it is the first signalling subword after a valid correlator detect in block 728. If first word line 614 indicates that the input device contains the first subword after a valid detect, then control proceeds back to block 710, wherein the subword is treated as the first subword of a data word. In this case, it is assumed that the PLL clock has slowed during a fade such that the detect has arrived earlier than expected. If not the first subword, the subword is cleared from the input device in block 730, the subword counter is decremented in block 732, and the counter is tested in block 734. If all subwords of the signalling word have not been cleared, control returns to block 726.

If enough subwords have been input such that all signalling subwords should have been cleared, the next subword input by SSDA 610 is treated as a data word whether or not a valid detect has occurred. This would be the case when the clock recovery phase-locked loop drifts such that the correlator detect arrives late, or during a longer fade when the correlator detect doesn't arrive at all. Hence, control proceeds to block 736 which waits for the next input subword, and continues with block 710. In this manner, the reformatter acts as a "flywheel" between correlation detects to output the correct number of data bits, even if the signalling word itself was lost during a fade.

Since the same number of data bits are output from the base unit reformatter as were input to the remote unit formatter, any bit slips have now been corrected. Furthermore, since the output device derives output clock 264 from the number of data bits being output, the reformatter has also corrected the recovered clock signal. These 10 kHz clock and data "bursts" are then time-adjusted in the elastic buffer.

Figure 8:
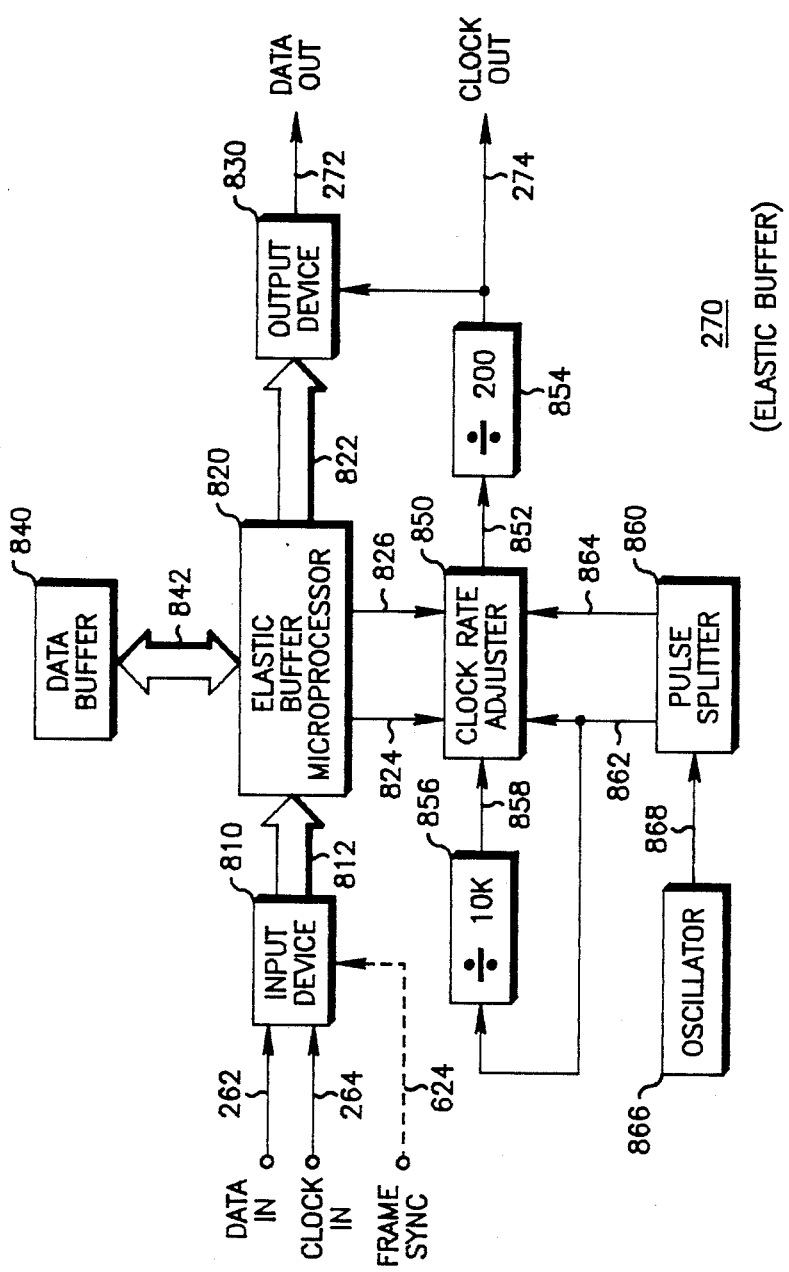
FIG. 8 is a block diagram of the elastic buffer block of FIG. 2, illustrating the hardware components of the block.

The internal sturcture of elastic buffer 270 is illustrated in FIG. 8. The elastic buffer serves time-align the "bursted" 10 kHz clock and data inputs into a continuous 9.6 kHz clock and data outputs. Moreover, the elastic buffer provides standard modem compatibility between the base station and the landline station, since it outputs 9.6 kbps data with controlled 100 ppm adjustments regardless of the input data rate. Therefore, as the RF channel 10 kbps data rate is being synchronized, the guaranteed clock out of the elastic buffer is simultaneously available for modem training. The alternative approach of utilizing a PLL to directly derive a 9.6 kHz clock from the 10 kbps RF channel would require the modem training to wait until the RF channel clock is locked.

Essentially, the buffer outputs the data at a nominal rate of 9.6 kHz, but this rate can be slightly slowed down or sped up as needed. Elastic buffer 270 acts as a variable length shift register when buffering the data. The buffer attempts to keep this delay in a middle range by slowing down the 9.6 kHz output clock if the buffer size gets below a certain value, and by speeding up the output clock if the buffer size gets above a certain value. In this manner, the buffer matches the discontinuous 10 kHz input clock to the continuous 9.6 kHz output clock with a frequency locked to the effective 9.6 kbps data rate over the channel.

Figure 9:
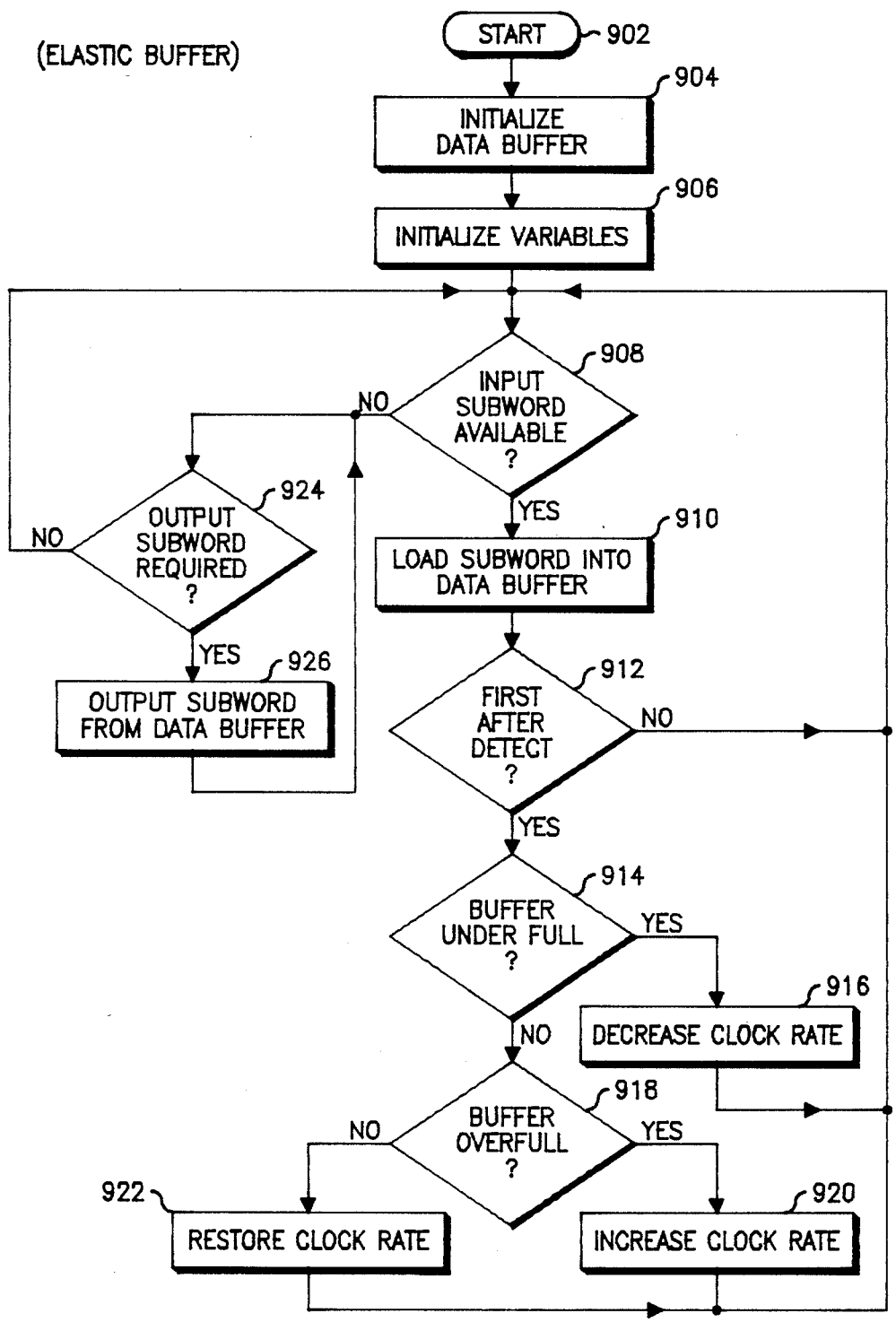
FIG. 9 is a simplified flowchart diagram showing the sequence of software steps performed by the elastic buffer microprocessor of FIG. 8.

The operation of elastic buffer 270, shown in FIG. 8, will now be described in conjunction with the software flowchart of FIG. 9 and the waveform diagram of FIG. 10. First, the "bursted" 10 kHz data is input to SSDA input device 810 via line 262, along with its irregular clock rate at line 264. Frame sync 624, from the reformatter, is also input to determine where the first word of the frame begins. SSDA input device 810 converts the serial data to 7-bit subwords available on microcomputer data bus 812. Elastic buffer microprocessor 820 periodically loads subwords into data buffer 840, another RAM, via data bus 842. The microprocessor reads this buffer to determine whether the clock rate should be sped up or slowed down. The data subwords are then output via data bus 822 to output device 830, another SSDA. The output clock is derived from the clock rate adjust circuitry which will be described later. The data output 272 and the clock output at 274 then correspond to the 9.6 kHz±0.96 Hz modem tolerance Referring now to FIGS. 8 and 9, elastic buffer microprocessor 820 starts operation at block 902, initializes data buffer 840 in block 904 to receive input data, and initializes internal variables in block 906. For example, fast and slow clock lines 824 and 826 must be reset to their proper state. In block 908, the microprocessor looks at data bus 812 to see if an input subword is available. If a 7-bit subword is available, control proceeds with block 910 to load the subword into data buffer 840. In the preferred embodiment, buffer 840 is FIFO implemented in RAM to contain eight 7-bit subwords. Block 912 tests to see if the subword loaded into the buffer is the first subword after a correlation detect. If not, control returns to read another subword. This step is required in order to keep the clock frequency relatively constant by adjusting the clock rate only once per frame.

If a frame has just begun, block 914 tests the length of the data in the buffer. If the data buffer is underfull, i.e, contains less than 4 subwords, then the decision is made to decrease the 9.6 kHz clock rate via block 916. In other words, the input data rate is slightly slower than the required output data rate. Hence, slow clock line 826 is set high, and the clock rate adjusting circuitry slows down the output clock. If the data buffer is overfull, i.e, contains greater than 4 subwords, a decision is made in block 918 to increase the output clock rate via block 920. Hence, fast clock line 824 from the microprocessor is set high. If the buffer is neither underfull nor overfull, the clock rate is restored to the nominal 9.6 kHz in block 922 by resetting fast and slow clock lines 824 and 826, and control returns to block 908.

In block 908, if an input subword is not available from the input SSDA, then the microprocessor checks the output SSDA device 830 to see if an output subword is required in block 924. If not, control again returns to block 908 to test for input subwords If an output subword is required, then a subword is output from the data buffer to the output SSDA in block 926. Output SSDA 830 utilizes the corrected clock output 274 to convert the parallel subword to a serial 9.6 kbps data stream on line 272.

FIG. 10 illustrates the waveforms of the clock rate adjuster circuitry of elastic buffer 270. Since the reformatter has ensured that the 10 kbps "bursted" input data at 262 has the correct number of data bits, the correct number of 10 kHz clock pulses is also ensured. Elastic buffer 270 time-aligns this bursted 10 kbps data and clock input to provide a continuous 9.6 kbps data and clock output.

In the preferred embodiment, oscillator 866 produces a 3.84 MHz output on line 868 as shown in FIG. 10A. This clock is "split" into two 1.92 MHz clocks, which are approximately 180 degrees out of phase, in pulse splitter block 860. The first 1.92 MHz clock on line 862, shown in FIG. 10B, is applied to divide-by-10,000 block 856, as well as to clock rate adjuster 850. The delayed version of the split-clock signal, shown in FIG. 10C, is applied to clock rate adjuster 850 via line 864. FIG. 10D illustrates the 192 Hz clock signal available on line 858 from the divide-by-10,000 block 856. FIGS. 10E and 10F illustrate fast and slow clock lines 824 and 826, respectively. If fast clock line 824 is high, a clock pulse is added by clock rate adjuster 850 during the time that line 858 is high. Similarly, if slow clock line 826 is high, a clock pulse is deleted directly following the 192 Hz pulse on line 858. This divide-by-10,000 ensures that the output clock rate is maintained to be within the modem specification of 100 ppm (192 Hz/1.92 MHz). The output of clock rate adjuster 850, line 852 shown as FIG. 10G, is applied to divide-by-200 block 854 to produce a 9.6 kHz clock with a 50% duty cycle on line 274. This time-aligned clock signal is used to output the data to the modem.

A similar add/delete clock pulse scheme is described in more detail in U.S. Pat. No. 4,574,243, entitled, "Multiple Frequency Digital Phase-Locked Loop". For example, specific circuitry is illustrated in that patent which would serve the function of pulse splitter block 860 (flip/flop 101) and clock rate adjuster 850 (frequency adjust network 12). Elastic buffer microprocessor 820 in the preferred embodiment, is a Motorola MC6809 8-bit microprocessor. Data buffer 840 may be implemented by a Motorola MCM6116P12 2Kx8 RAM. nput device 810 and output device 830 are Motorola MC6852 SSDA's. The other components of FIG. 8 are known in the art.

In review, a method for continuous bit synchronization from the mobile through the base site to the landline terminal has been described. The bit synchronization scheme of the present invention can withstand RF phase jumps, channel fading, frequency drift between the mobile and base clocks, and bit slippage due to an out of lock phase-locked loop at the mobile or base.

In the preferred embodiment, the present invention is utilized in a 900 MHz digital cellular radiotelephone system having voice privacy. However, it can be seen that the bit slip correction scheme of the present invention may be used for any data transmission path requiring continuous bit synchronization. Furthermore, the description herein is merely one embodiment of which many alternative constructions are contemplated For example, several parallel to serial conversions performed by the SSDA's may be combined and/or omitted, and the function of the individual microprocessor blocks in the figures may also reassigned While only particular embodiments of the invention have been shown and described herein, it will be obvious that further modifications may be made without departing from the invention in its broader aspects and, accordingly, the appended claims are intended to cover all such changes and alternative constructions that fall within the true scope and spirit of the invention.

What is claimed is:

1. A method of providing continuous bit synchronization of an input data stream to an output data stream over a first data transmission path having digital signalling capabilities, said bit synchronization method comprising the steps of:
   (a) accepting an input data stream at a first bit rate, and accepting at least one predetermined signalling word;
   (b) interleaving said signalling word with a predetermined number of data bits of said input data stream to provide a combined data message having a second bit rate;
   (c) transmitting said combined data message via said first data transmission path;
   (d) receiving said transmitted data message;
   (e) recovering a clock signal from said received data message;

(f) separating said signalling word from said received data message to provide separated data words having an instantaneous bit rate corresponding to said recovered clock signal;

(g) modifying the number of data bits of said separated data words to approximate said predetermined number of data bits, thereby providing modified data words; and (h) modifying the clock rate of said modified data words to correspond to said first bit rate, thereby providing an output data stream which is in bit synchronization with said input data stream.

2. The method according to claim 1, wherein said first data transmission path is a radio frequency (RF) channel.

3. The method according to claim 3, wherein said RF channel is one of a plurality of frequency modulated RF channels in a mobile radiotelephone system.

4. The method according to claim 1, further including the step of encrypting said input data stream prior to the step of interleaving with said signalling word.

5. The method according to claim 1, further including the step of decrypting said output data stream.

6. The method according to claim 5, wherein said decrypting step is performed by a decryption device which cannot self-synchronize.

7. The method according to claim 6, further comprising the step of transmitting said output data stream via a second data transmission path at said first bit rate.

8. The method according to claim 7, wherein said output data stream transmitted via said second transmission path does not contain additional overhead information utilized for data decryption.

9. The method according to claim 7, wherein said output data stream is received from said second transmission path and subsequently decrypted.

10. The method according to claim 1, wherein said first bit rate is approximately 9.6 kbps and wherein said second bit rate is approximately 10 kbps.

11. The method according to claim 1, wherein said predetermined number of data bits of said input data stream is determined as a function of the number of bits of said predetermined signalling word and said first and second bit rates.

12. The method according to claim 1, wherein the ratio of: (a) said predetermined number of data bits plus the number of data bits in said signalling word, to (b) said predetermined number of data bits, is equal to the ratio of: (c) said second bit rate, to (d) said first bit rate.

13. The method according to claim 1, wherein said signalling word separating step includes the step of correlating said received data message with a known signalling word to provide a correlation detect signal.

14. The method according to claim claim 13, wherein said data modifying step includes the steps of counting the number of data bits of said separated data word input after the occurrence of said correlation detect signal until said predetermined number of data bits have been counted, and outputting said predetermined number of data bits as a modified data word.

15. The method according to claim 1, further comprising the step of transmitting said output data stream at said first bit rate via a modem having a given input data rate tolerance.

16. The method according to claim 15, wherein said modem input data rate tolerance is less than or equal to 100 ppm.

17. The method according to claim 16, wherein said clock rate modifying step includes the step of adjusting the clock rate of said output data stream to be within said modem tolerance.

18. The method according to claim 1, wherein said clock rate modifying step includes the steps of loading data into a data buffer at an input clock rate, said data buffer having overflow and underflow indicators, unloading data from said data buffer at an output clock rate, and changing said output clock rate in response to said overflow and underflow indicators.

19. The method according to claim 1, further including the step of encoding said combined data message prior to said transmitting step.

20. The method according to claim 19, further including the step of decoding said received data message.

21. The method according to claim 19, wherein said encoding step is performed utilizing the Manchester data encoding format.

22. A method of maintaining continuous bit synchronization of digitally encrypted speech transmitted over both landline and radio frequency (RF) data transmission paths between a land station and a remote station through a base station, said bit synchronization in the remote station:

converting an analog input speech signal into digital speech data to provide an input data stream having a first bit rate;

encrypting said input data stream to provide an encrypted data stream;

interleaving a predetermined number of data bits of said encrypted data stream with a plurality of predetermined signalling words to provide a combined data message having a second bit rate;

encoding said combined data message into a digital format;

transmitting said encoded data message via said RF transmission path;

in the base station:

receiving said transmitted data message from said RF transmission path;

phase-locking a clock signal to said received data message and clocking said received data message through subsequent steps with said phase-locked clock signal;

decoding said received data message;

correlating said signalling words of said received data message with known signalling words to provide a correlation detect signal;

counting a number of data bits of said received data message occurring after said correlation detect signal until said predetermined number of data bits have been counted;

separating said counted number of data bits from said received data message to provide a plurality of separated data words having an instantaneous bit rate corresponding to said phase-locked clock signal;

buffering said separated data words to provide a continuous data stream at said first bit rate;

adjusting the clock rate of said continuous data stream to meet predetermined data rate tolerance requirements of landline transmission equipment;

transmitting said adjusted data stream via said landline transmission path;

in said land station:

receiving said tansmitted data stream from said landline transmission path;

decrypting said received data stream and
converting said decrypted data stream into an analog signal, thereby reconstructing said input speech signal.

23. The method according to claim 22, wherein said RF data transmission path is one of a plurality of frequency modulated RF channesl in a mobile radiotelephone system.

24. The method according to claim 22, wherein said first bit rate is approximately 9.6 kbps and wherein said second bit rate is approximately 10 kbps.

25. The method according to claim 22, wherein said predetermined signalling word contains information utilized for digital signalling purposes other than for providing bit synchronization, and does not contain information utilized for decrypting speech data.

26. The method according to claim 22, wherein the ratio of: (a) said predetermined number of data bits plus the number of data bits in said signalling word, to (b) said predetermined number of dat bits, is equal to the ratio of: (c) said second bit rate, to (d) said first bit rate.

27. The method according to claim 22, wherein the requirements of said landline transmission equipment include a modem input data rate tolerance of less than or equal to 100 ppm.

28. The method according to claim 22, wherein said clock rate adjusting step includes the steps of loading data into a data buffer at an input clock rate, said data buffer having overflow and underflow indicators, unloading data from said data buffer at an output clock rate, and changing said output clock rate in response to said overflow and underflow indicators.

29. The method according to claim 22, wherein said encrypting step is performed by an encryption device operating in the counter-address mode.

30. The method according to claim 22, wherein said encrypting step is performed by an encryption device operating in the output-feedback mode.

31. The method according to claim 22, wherein said encoding step is performed utilizing the Manchester data encoding format.

32. The method according to claim 22, wherein said digitally encrypted speech originates in said land statio and is transmitted over both landline and RF data transmission paths to said remote station through said base station.

33. The method according to claim 22, wherein said land station and said remote station, communicate in the full duplex mode of operation.

34. A data communications system capable of maintaining continuous bit synchronization of an input data stream to an output data stream over a data transmission path having digital signalling capabilities, said data communications system comprising:
(a) means for accepting an input data stream at a first bit rate, and accepting at least one predetermined signalling word;
(b) means for interleaving said signalling word with a predetermined number of data bits of said input data stream to provide a combined data message having a second bit rate;
(c) means for transmitting said combined data message via said data transmission path;
(d) means for receiving said transmitted data message;
(e) means for recovering a clock signal from said received data message;
(f) means for separating said signalling word from said received data message to provide separated data words having an instantaneous bit rate corresponding to said recovered clock signal;
(g) means for modifying the number of data bits of said separated data words to approximate said predetermined number of data bits, thereby providing
(h) means for modifying the clock rate of said modified data words to correspond to said first bit rate, thereby providing an output data stream which is in bit synchronization with said input data stream.

35. The system according to claim 34, wherein said data transmission path is one of a plurality of frequency modulated radio frequency (RF) channels in a mobile radiotelephone system.

36. The system according to claim 34, further including means for encrypting said input data stream and for decrypting said output data stream.

37. The system according to claim 36, wherein said decrypting means is a decryption device which cannot self-synchronize.

38. The system according to claim 34, wherein said first bit rate is approximately 9.6 kbps and wherein said second bit rate is approximately 10 kbps.

39. The system according to claim 34, wherein the ratio of: (a) said predetermined number of data bits plus the number of data bits ins aid signalling word, to (b) said predetermined number of data bits, is equal to the ratio of: (c) said second bit rate, to (d) said first bit rate.

40. The system according to claim 34, wherein said clock rate modifying means includes means for loading data into a data buffer at an input clock rate, said data buffer having overflow and underflow indicators, means for unloading data from said data buffer at an output clock rate, and means for changing said output clock rate in response to said overflow and underflow indicators.

41. A method of providing continuous bit synchronization of an input data stream to an output data stream, said input data stream having a first bit rate, wherein a predetermined number of data bits of said input data stream are interleaved with at least one predetermined signalling word to form a received data message, said received data message having a second bit rate, said bit synchronization method comprising the steps of:
(a) recovering a clock signal from said received data message;
(b) separating said signalling word from said received data message to provide separated data words having an instantaneous bit rate corresponding to said recovered clock signal;
(c) modifying the number of data bits of said separated data words to correspond to said predetermined number of data bits, thereby providing modified data words; and
(d) modifying the clock rate of said modified data words to correspond to said first bit rate, thereby providing an output data stream which is in bit synchronization with said input data stream.

42. The method according to claim 41, wherein said predetermined number to data bits of said input data stream is determined as a function of the number of bits of said predetermined signalling word and said first and second bit rates.

43. The method according to claim 4!, wherein the ratio of: (a) said predetermined number of data bits plus the number of data bits in said signalling word, to (b) said predetermined number of data bits, is equal to the ratio of: (c) said second bit rate, to (d) said first bit rate.

44. The method according to claim 41, wherein said signalling word separating step includes the step of correlating said received data message with a known signalling word to provide a correlation detect signal.

45. The method according to claim 44, wherein said data modifying step includes the steps of counting the number of data bits of said separated data word input after the occurrence of said correlation detect signal until said predetermined number of data bits have been counted, and outputting said predetermined number of data bits as a modified data word.

46. The method according to claim 41, wherein said clock rate modifying step includes the steps of loading data into a data buffer at an input clock rate, said data buffer having overflow and underflow indicators, unloading data from said data buffer at an output clock rate, and changing said output clock rate in response to said overflow and underflow indicators.

47. A data communications receiver capable of maintaining continuous bit synchronization of an input data stream to an output data stream, said input data stream having a first bit rate, wheein a predetermined number of data bits of said input data stream are interleaved with at least one predetermined signalling word to form a transmitted data message, said transmitted data message having a second bit rate, said data communications receiver comprising:
   (a) means for receiving said transmitted data message;
   (b) means for recovering a clock signal from said received data message;
   (c) means for separating said signalling word from said received data message to provide separated data words having an instantaneous bit rate corresponding to said recovered clock signal;
   (d) means for modifying the number of data bits of said separated data words to correspond to said predetermined number of data bits, thereby providing modified data words; and
   (e) means for modifying the clock rate of said modified data words to correspond to said first bit rate, thereby providing an output data stream which is in bit synchronization with said input data stream.

48. The data receiver according to claim 47, wherein said predetermined number of data bits of said input data stream is determined as a function of the number of bits of said predetermined signalling word and said first and second bit rates.

49. The data receiver according to claim 47, wherein the ratio of: (a) said predetermined number of data bits plus the number of data bits in said signalling word, to (b) said predetermined number of data bits, is equal to the ratio of: (c) said second bit rate, to (d) said first bit rate.

50. The data receiver according to claim 47, wherein said signalling word separating means includes means for correlating said received data message with a known signalling word to provide a correlation detect signal.

51. The data receiver according to claim 50, wherein said data modifying means includes means for counting the number of data bits of said separated data word input after the occurrence of said correlation detect signal until said predetermined number of data bits have been counted, and outputting said predetermined number of data bits as a modified data word.

52. The data receiver according to claim 47, wherein said clock rate modifying means includes means for loading data into a data buffer at an input clock rate, said data buffer having overflow and underflow indicators, means for unloading data from said data buffer at an output clock rate, and means for changing said output clock rate in response to said overflow and underflow indicators.

* * * * *

UNITED STATES PATENT AND TRADEMARK OFFICE
CERTIFICATE OF CORRECTION

PATENT NO. : 4,803,726
DATED : February 7, 1989
INVENTOR(S) : Stephen N. Levine, et al.

It is certified that error appears in the above-identified patent and that said Letters Patent is hereby corrected as shown below:

Col. 17, line 16: Change "claim 3" to -- claim 2 --.

Col. 17, line 22: Change "claim 1" to -- claim 4 --.

Col. 18, line 24: After "synchronization" insert -- method comprising the steps of: --.

Col. 19, line 20: Change "dat" to -- data --.

Col. 19, line 43: Change "statio" to -- station --.

Col. 20, line 5: After "providing" insert -- modified data words; and --.

Col. 21, line 22: Change "wheein" to -- wherein --.

Signed and Sealed this

Twelfth Day of December, 1989

*Attest:*

JEFFREY M. SAMUELS

*Attesting Officer*    Acting Commissioner of Patents and Trademarks